Sept. 8, 1970 TUNEO MONDEN ET AL 3,526,942

MOTOR DRIVEN ROTARY COMPRESSORS

Filed June 19, 1968

INVENTORS
Tuneo Monden
Makoto Watanabe
BY
George B. Oujevolk
Attorney

FIG. 2
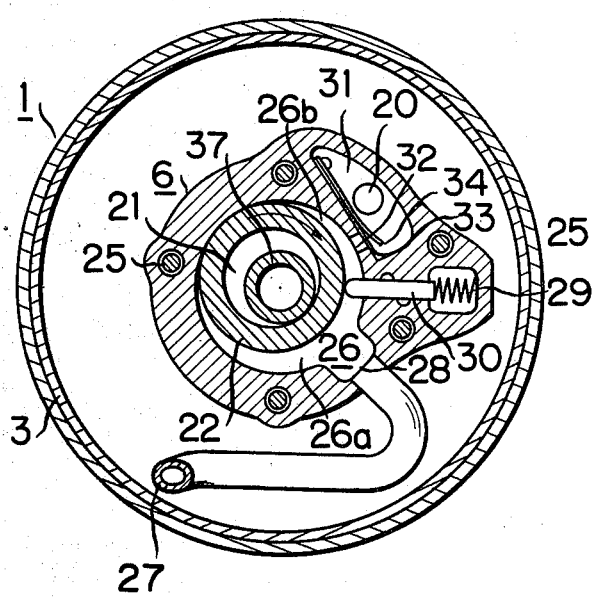
FIG. 3-A 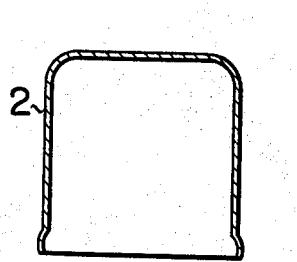
FIG. 3-B 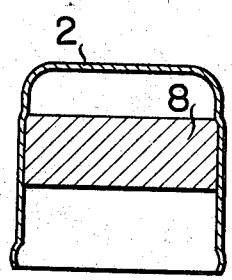
FIG. 3-C 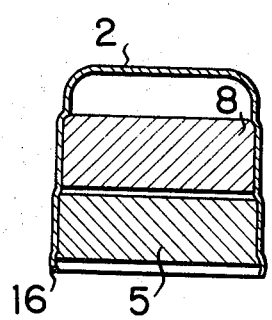

United States Patent Office 3,526,942
Patented Sept. 8, 1970

3,526,942
MOTOR DRIVEN ROTARY COMPRESSORS
Tuneo Monden, Tokyo, and Makoto Watanabe, Kawasaki-shi, Japan, assignors to Tokyo Shibaura Electric Co., Ltd., Kawasaki-shi, Japan, a corporation of Japan
Filed June 19, 1968, Ser. No. 738,178
Claims priority, application Japan, June 21, 1967, 42/39,812, 42/53,294
Int. Cl. B23b *15/00;* B21d *39/02;* F04c *23/02*
U.S. Cl. 29—156.4                                     4 Claims

ABSTRACT OF THE DISCLOSURE

In a motor driven rotary compressor comprising a motor, a frame for supporting the motor and a compressor which are contained in a hermetically sealed casing, the casing is made of two halves, the diameter of the frame is made larger than that of the motor stator, the stator is first force fit in one casing half, then the frame is force fit and the other casing half is joined to the one casing half by a faucet joint.

BACKGROUND OF THE INVENTION

This invention relates to a hermetically sealed type motor driven rotary compressor of the type utilizing rolling motion of an eccentric rotor, and more particularly to improved means for securing the stator of a driving motor and a frame for supporting the compressor in the hermetically sealed casing.

According to the prior method of mounting the motor and compressor in the hermetically sealed casing, at first the stator of the motor is inserted in the sealed casing, then a frame supporting the shaft of the motor is force fit and then the compressor is secured to the frame by a suitable means such as bolts and the like.

In this construction, since the outer diameter of the frame is made slightly smaller than the inner diameter of the sealed casing in order to provide required fit clearance, the frame tends to move when the assembly is subjected to vibrations and shocks during transportation.

When the stator of the motor is force fit after insertion of the frame into the sealed casing, centering of the inner diameter of the motor stator and that of the bearing portion of the frame becomes difficult so that it is difficult to assure uniform air gap between the rotor and the stator of the motor thus resulting in the magnetic unbalance as well as noise. Also there is a small air gap between the periphery of the stator and the inner surface of the sealed casing. In the sealed type compressor this air gap greatly reduces heat dissipation of the motor. As is well known in the air, in one type of the sealed type motor compressor, high temperature gaseous refrigerant compressed by the compressor is discharged into a chamber containing the motor and after passing through the motor the gaseous refrigerant is discharged to a condenser on the exterior of the casing. As a result, the temperature of the motor is increased by the heat generated in its winding and by the heat of the compressed gaseous refrigerant. Sometimes, the temperature of the motor exceeds its permissible temperature rise, thus burning out the winding. However, in the driving motor for a sealed type compressor it is impossible to provide a cooling fan for the rotor to create ventilation so that dissipation of the heat generated in the casing should be made only through heat conduction to the sealed casing from the stator. Above described air gap between the stator and the sealed casing presents a large heat resistance therebetween thus preventing heat dissipation of the stator through the sealed casing.

SUMMARY OF THE INVENTION

According to this invention above described defects can be obviated by designing the motor stator and the supporting frame to have different outer diameters and by firstly force fitting a member of smaller diameter into the sealed casing and then force fitting the other member having larger diameter. The frame is provided with a flange which is received in the enlarged end of one of the casing halves and clamped in position by the end of other casing half which is inserted in the enlarged end. The joint between two casing halves is welded to complete a sealed casing.

Force fit assembly not only eliminates loosening of component parts caused by shocks or vibrations occurring during transportation but also assures precise centering of the component parts thus providing a uniform air gap for the driving motor. Direct contact between motor stator and sealed casing improves heat dissipation from the motor thus decreasing overall dimension of the assembly.

BRIEF DESCRIPTION OF THE DRAWINGS

FIG. 2 shows a cross-section of the compressor taken along a line II—II in FIG. 1;

FIGS. 3–A, 3–B and 3–C show various steps of assembling the motor driven rotary compressor.

DESCRIPTION OF THE PREFERRED EMBODIMENTS

Figure 1:
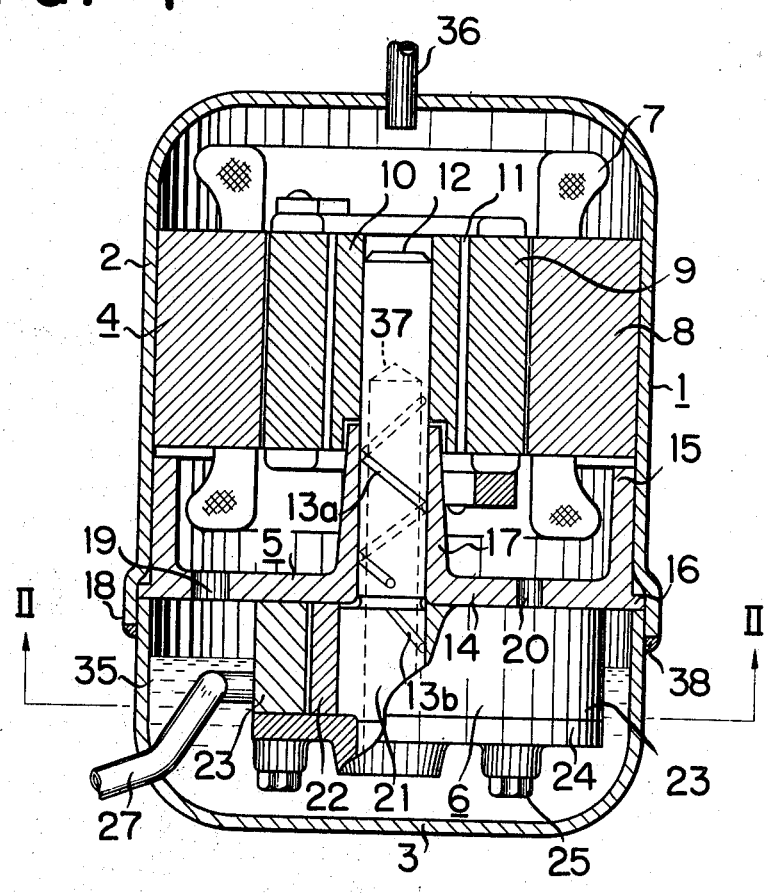
FIG. 1 shows an elevational view, partly in section, of a motor driven rotary compressor embodying this invention.

Referring now to the accompanying drawings, FIG. 1 shows an embodiment of the motor driven rotary compressor which comprises a hermetically sealed casing 1 consisting of an upper casing half 2 and a lower casing half 3 joined together by a faucet joint. An electric motor 4, a frame 5 also acting as a bearing for a motor shaft 12 and a rotary compressor 6 are contained in the casing 1. A stator core 8 of the motor provided with a stator coil 7 is securely mounted on the inner wall of the upper casing half 2 as by force fit, and a rotor 10 rotating in the stator core 8 with an air gap 9 therebetween is provided with axial air ducts 11. A spiral oil groove 13*a* is formed on the periphery of the lower portion of shaft 12. Frame 5 comprises a horizontal partition 14, a cylindrical member 15 receives in the upper casing half 2, a flange 16 on the periphery of the partition 14 and a bearing member 17 adapted to journal motor shaft 12. As shown the cylindrical member is intimately fit in the upper casing half 2 immediately beneath the stator core 8 and the flange 16 is fit in the upper casing half at the joint 18 between upper and lower casing halves. The horizontal partition 14 is provided with a perforation 19 which interconnects the interior of the upper casing half in which is contained the motor and the interior of the lower casing half containing the compressor 6 and a perforation 20 which interconnects the interior of the upper casing half and a muffler chamber of the compressor 6 to be described later.

As shown in FIG. 2, compressor 6 comprises a rotor 22 fit around an eccentric 21 formed at the lower end of the motor shaft 12 and a cylinder 23 encircling the rotor, the cylinder being fixed to the lower side of the horizontal partition 14 by bolts 25 together with an end plate 24. The cylinder 23 is formed with a chamber 26 containing the eccentric 21 and rotor 22 and a suction port 28 communicated with a suction pipe 27, as shown in FIG. 2. The chamber 26 is divided by a sliding blade 30 into a low pressure gas chamber 26a and a high pressure gas chamber 26b, said blade being normally urged against the periphery of the rotor 22 by means of a compression spring 29. The cylinder is also provided with a muffler chamber 31 communicated with the perforation 20 of the partition 14. The muffler chamber 31 is also communicated with the high pressure gas chamber 26b through a discharge port 32 and a discharge valve 33, the movement thereof being limited by a stop 34. A body of lubricating oil 35 is contained in the bottom of lower casing half 3 to partially immerse the compressor 6.

This invention is characterized by providing means of securing motor stator 8 and frame 5 in the sealed casing. In the embodiment shown in FIGS. 3-A, 3-B and 3-C, outer diameters of motor stator 8, cylindrical portion 15 and flange 16 of the frame 5 are gradually increased in the order mentioned. The inner surface of the upper casing half 2 is precisely machined to have desired internal diameter. As shown in FIG. 3-B at first the stator 8 is force fit in the upper casing half. By the force fit this casing half undergoes elastic deformation from the original configuration as shown by dotted lines to the final configuration shown by solid lines in FIG. 3-B. Thereafter the frame 5 having a slightly larger outer diameter than the stator 8 is force fit into the casing half 2. Then the lower portion thereof further undergoes elastic deformation to assume the state shown in FIG. 3-C.

Although the flange 16 has a larger outer diameter than the frame 5, it can be readily received in the lower end of the casing half 2 because the cylindrical portion 15 has already enlarged the lower portion. Thus by gradually increasing the diameters of the stator 8, cylindrical portion 15 and flange 16 in accordance with the elastic deformation of the outer casing 2, ideal fit allowance can be provided.

Figure 4:
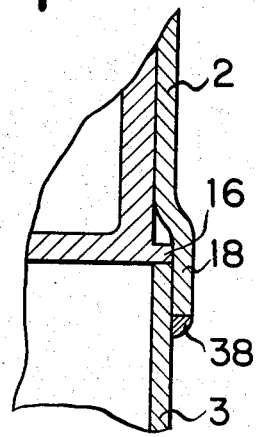
FIG. 4 is an enlarged sectional view of a portion of the frame mounting.

Further, as best shown in FIG. 4, in accordance with this invention, the flange 16 formed on the frame 5 has a diameter slightly larger than the inner diameter of the upper casing half 2, the upper and lower casing halves can be tightly joined together by inserting the latter into the slightly enlarged joint 18 until its upper end comes into contact against the lower surface of the flange 16 and thereafter electrically welding the entire periphery of the lower end of the upper casing half 2 as at 38.

As the construction and the operation of the illustrated compressor connected in a refrigerating system are well known in the art, detailed description thereof is believed unnecessary. Briefly, during operation of the refrigerating system gaseous refrigerant is compressed by the rotary movement of the rotor 22 and the high pressure gaseous refrigerant exhausted in the muffler chamber 31 is supplied to a condenser, not shown, through perforation 20, air gap between the rotor and stator as well as air ducts 11 of the motor and through discharge pipe 36. Lubricating oil 35 pumped up by the rotary movement of motor shaft 12 is supplied to bearing 12 and to the interior of the rotary compressor through spiral grooves 13a and 13b to lubricate moving parts and to provide oil seals between high and low pressure sides.

As described above, according to this invention the motor stator 8 is directly force fit in the sealed casing 1 so that there is no air gap therebtween. Accordingly, the heat generated by the coil 7 can be directly transmitted from the stator 8 to the sealed casing 1. As a result it was found that the temperature of the coil was reduced by about 15 to 25° C. when compared with the prior construction, thus increasing the operating efficiency of the motor. Further in the type illustrated, as the compressed high temperature and high pressure gas is discharged in the sealed casing the tempearture of the motor is also elevated by the heat of compressed gas. Force fit construction of this invention is also effective to dissipate the heat due to compressed gaseous refrigerant. Force fit construction not only eliminates bolts, tapped holes or other means for fastening the motor to the sealed casing but also reduces the overall dimension of the motor driven compressor.

As the stator is firmly secured to the sealed casing by force fit, there is no fear of loosening the stator 8 and frame 5 due to shock or vibration occurring during transportation and the stator and frame can be accurately centered with respect to the sealed casing, thus assuring uniform air gap of the motor 4.

Also assembling of components is greately simplified because according to this invention the flange 16 of the supporting frame 15 is inserted in the enlarged lower end 18 of one casing half, the edge of the other casing half is inserted to clamp the flange and thereafter the step formed at the joint of two casing halves is welded along the periphery of the sealed casing. Flange 16 serves to prevent dust, especially molten metal spattered during welding from entering into the sealed casing.

Construction of the compressor itself may be variously modified. For example, an eccentric cylinder may be directly mounted upon the motor shaft. Further the outer diameter of the motor stator may be made slightly larger than that of the frame in which case the frame is firstly force fit into the sealed casing and then the stator is force fit.

While the invention has been shown and described in terms of preferred embodiments thereof it should be understood that many modifications and alterations will be obvious to those skilled in the art without departing from the scope of the invention as defined in the appended claims.

What is claimed is:

1. A method of construction of a motor driven rotary compressor in a hollow casing, including therein an outer cylindrical stator and a cylindrical frame holding a rotor, comprising the steps of:
    (a) force fitting the stator in an upper casing half so as to cause said casing half to undergo elastic deformation;
    (b) force fitting a frame with a flange at its outer end which has a larger outer diameter than said stator into said upper casing half so that the lower portion of said casing half has elastic deformation; and, force fitting the casing lower half open end into the outer open end of the upper casing half.

2. The method of claim 1 wherein the inner surface of the upper casing half is first machined to the desired diameter.

3. The method of claim 1 wherein said flange has a diameter slightly larger than the inner diameter of the upper casing half, the upper and lower casing halves being tightly joined by inserting the lower casing half until its outer end comes into contact with the outer surface of the flange.

4. The method of claim 3 where the step formed at the joint of the two casing halves is welded along the periphery of the sealed casing.

References Cited

UNITED STATES PATENTS

| 2,612,311 | 9/1952 | Warrick et al. | 230—139 |
| 2,883,101 | 4/1959 | Kosfeld | 230—207 |

FOREIGN PATENTS

| 1,003,552 | 1/1947 | France. | |

ROBERT M. WALKER, Primary Examiner

U.S. Cl. X.R.

29—463, 525; 230—139